United States Patent [19]

Reid

[11] 4,096,326

[45] Jun. 20, 1978

[54] DIHYDROXYPROPYL CELLULOSE

[75] Inventor: Albert R. Reid, Hockessin, Del.

[73] Assignee: Hercules Incorporated, Wilmington, Del.

[21] Appl. No.: 731,952

[22] Filed: Oct. 13, 1976

[51] Int. Cl.$^2$ .................... C08B 11/08; C08B 11/20
[52] U.S. Cl. ........................................ 536/95; 536/91
[58] Field of Search ................. 536/90, 91, 95, 96, 536/84

[56] References Cited

U.S. PATENT DOCUMENTS

| | | | |
|---|---|---|---|
| 1,502,379 | 7/1924 | Dreyfus | 536/84 |
| 1,722,927 | 7/1929 | Lilienfeld | 536/84 |
| 1,722,928 | 7/1929 | Lilienfeld | 536/84 |
| 2,265,918 | 12/1941 | Lilienfeld | 536/84 |
| 2,572,039 | 10/1951 | Klug et al. | 536/84 |
| 3,069,311 | 12/1962 | Harpham et al. | 162/146 |
| 3,388,082 | 6/1968 | Rodgers et al. | 536/91 |
| 3,926,951 | 12/1975 | Lindenfors et al. | 536/91 |
| 4,001,210 | 1/1977 | Engelskirchen et al. | 536/95 |
| 4,001,211 | 1/1977 | Sarkar | 536/84 |

FOREIGN PATENT DOCUMENTS 2,415,154  10/1975  Germany .............................. 536/95

*Primary Examiner*—Ronald W. Griffin
*Attorney, Agent, or Firm*—William S. Alexander

[57] ABSTRACT

Dihydroxypropyl ethers of cellulose are disclosed which are characterized by having a dihydroxypropyl M.S. of at least about 1.4 which are water-soluble and thermoplastic. These materials form complexes with borate and antimonate ions having unique and useful properties.

4 Claims, No Drawings

DIHYDROXYPROPYL CELLULOSE

This invention relates to a class of cellulose ethers having a unique combination of properties and to a novel method of preparing such ethers. Specifically, it relates to dihydroxypropyl cellulose and to mixed ethers in which at least a substantial portion of the ether substituent is the dihydroxypropyl group and to a method of preparation thereof.

Since the initial work of Lilienfeld and of Dreyfus in the 1920's relating to cellulose ethers, a continuing quest has gone on for new derivatives of cellulose and for modification of those already known. Out of this research, carboxymethyl cellulose, hydroxyethyl cellulose, methyl cellulose, hydroxypropyl cellulose and ethyl cellulose have developed into very significant items of commerce.

Among the early researchers into the preparation of cellulose ethers, it was suggested that cellulose can be reacted with 3-chloro-1,2-propanediol to form ethers. See, e.g., Dreyfus, U.S. Pat. No. 1,502,379, and Lilienfeld, U.S. Pat. No. 1,722,927. Both of these patents prepare what is referred to as an "oxyalkyl derivative of cellulose" by reaction of alkali cellulose with the above-mentioned 3-chloro-1,2-propanediol. In each case, however, little is told of the properties of the product except that it is soluble in alkali or organic liquids but insoluble in water. Nothing is stated in either reference concerning the substitution levels of these products. At a later date, in U.S. Pat. No. 2,572,039 to Klug et al, glycidol (2,3-epoxypropanol-1) is included in an omnibus listing of materials to which the inventive process of the patent can be applied to prepare allegedly water-soluble cellulose derivatives. There is, however, no example of its use, no suggestion that it had ever been prepared and no recognition of the critical precautions which must be observed to enable a water-soluble product to be prepared with glycidol.

Now, in accordance with this invention, a reaction product of 3-chloro-1,2-propanediol or glycidol and cellulose has been prepared which, in addition to being alkali-soluble, is readily soluble in water. This reaction product is a 1,2-dihydroxypropyl cellulose ether having at least about 1.4 dihydroxypropyl units per anhydroglucose unit of the cellulose backbone. The ether can be cellulose modified with the 1,3-dihydroxypropyl group alone, or a mixed ether containing, in addition to the 1,2-dihydroxypropyl group, alkyl groups, carboxyalkyl groups, hydroxyalkyl groups, benzyl groups or a mixed ether-ester containing acyl groups such as, e.g., acetate, butyrate or benzoate groups.

Also in accordance with this invention, it has been found that the water-soluble dihydroxypropyl cellulose forms useful complexes with certain borate and antimonate compounds which are highly stable in brine. Useful compounds can be prepared using a weight ratio of borate or antimonate compounds to DHPC between about 0.05/1 and 10/1 or more.

In order to prepare the water-soluble 1,2-dihydroxypropyl cellulose of this invention, it is necessary to use highly purified etherication reagents. Technical grades of the 3-chloro-1,2-propanediol contain impurities such as, e.g., glycerol dichlorohydrin or epichlorohydrin or similar difunctional agents. These are capable of cross-linking cellulose and do so under the etherifying reaction conditions. Formation of such cross-links renders the cellulosic material substantially insoluble in water. In fact, formation of cross-links is believed to be the explanation of the water insolubility of the prior art reaction products described by Lilienfeld and Dreyfus.

To be specific, the purity of the 3-chloro-1,2-propanediol must be such that the reagent has a refractive index of about 1.47715 to 1.47720 at 30° C. With glycidol, the refractive index must be about 1.43090. This degree of purity can be obtained via low temperature, high vacuum distillation.

The etherification is preferably carried out via the slurry technique described in U.S. Pat. No. 2,517,577 to E. D. Klug and J. S. Tinsley or U.S. Pat. No. 2,572,039 to E. D. Klug and H. G. Tennent. Briefly this technique involves reacting cellulosic furnish in the presence of an alkali in a sufficient volume of a secondary or tertiary alcohol to maintain the cellulose furnish and the product in the suspended state throughout the entire reaction time. In cases, such as will be discussed hereinafter, where the cellulosic furnish is a cellulose ether, the slurry process is preferred for the preparation thereof.

In the first step of the process for the preparation of hydroxyalkyl cellulose ether according to this invention, the cellulosic material, in particulate form, is mixed with an alcohol of the group consisting of the secondary 3-carbon and secondary and tertiary 4-carbon and 5-carbon aliphatic alcohols, and mixtures thereof, in the presence of alkali.

The cellulosic material can be any appropriate cellulose raw material such as chemical cotton, cotton linters, or wood pulp of the type conventionally used in chemical reactions. The cellulosic material may be bulk dried, sheet dried, pretreated with alkali, or otherwise prepared for reduction to particles sufficiently small to permit reaction thereon by the reactants. The cellulosic material can be ground in an attrition mill or similar device to fine particles, or it can be shredded, fluffed or otherwise treated. In any of these forms, the cellulose material is in particulate form suitable for the purposes of this invention. The ground, shredded, fluffed or otherwise treated cellulosic material constitutes a loose aggregate of individual fibers which, upon mixing with the alcoholic medium of the reaction mixture can be readily mixed, stirred, or agitated, and the fibers do not mat together or persist in the form of pellets or dense matted aggregates of fibers which cannot readily be reached and reacted upon by the reactants. The ideal state for the purposes of this invention is to have the cellulosic material suspended in the alcoholic medium, thus forming a slurry. Upon stirring or agitating such a suspension or slurry, the individual fibers or particles move about in the reaction mixture and are not unduly handicapped in such movement by the other fibers or particles.

In addition to cellulose, the furnish can also be a cellulose ether if the product to be prepared is to be a mixed ether. Thus, the furnish can be carboxymethyl cellulose of about 0.01 to 1.8 D.S., methyl cellulose of about 0.01 to 2.7 D.S., hydroxyethyl cellulose of about 0.01 to 5 M.S., hydroxypropyl cellulose of about 0.01 to 8 M.S., or any cellulose ether containing already the desired amount of the second substituent. Diluent systems for use with such furnishes must be selected with the solubility of the starting ether in mind, of course.

The alcohols utilized as diluents for the reaction are of the group consisting of the secondary 3-carbon and secondary and tertiary 4-carbon and 5-carbon aliphatic alcohols, namely, 2-propanol (isopropanol), 2-butanol (sec-butyl alcohol), 2-methyl-2-propanal (tert-butyl alcohol), 2-pentanol (methylpropyl carbinol), 3-pentanol (diethyl carbinol), 3-methyl-2-butanol (methyl isopropyl carbinol or sec-isoamyl alcohol), and 2-methyl-2-butanol (dimethylethyl carbinol or tert-amyl alcohol).

The alcohols according to this invention will be utilized in a quantity sufficient to prevent the water-soluble cellulose ether product from going into solution in the water present in the reaction mixture. This represents the minimum quantity and amounts to about 2 parts by weight of alcohol for each part by weight of water in the reaction mixture. As a rule, somewhat more than the minimum will be used in order to assure free agitation of the mixture. An unlimited quantity can be used, subject only to the inconveniences of unnecessary dilution. In general, a ratio of alcohol to cellulose maintained between about 2 and about 50 parts of alcohol to 1 part of cellulose and preferably between about 10 and about 25 parts of alcohol to 1 part of cellulose will be found to give satisfactory results. The alcohols can be used singly or admixtures of two or more alcohols can be used as desired.

The alkali present in the reaction mixture is usually sodium hydroxide. However, any of the strong alkali hydroxides are suitable, including potassium hydroxide. Any amount of alkali can be used in the process of the present invention as long as there is sufficient to neutralize 3-chloro-1,2-propanediol reagent and have excess present to swell the cellulose and catalyze the reaction. Ordinarily, the caustic content should be within a range from about 0.5 mole to about 3 moles of caustic per mole of cellulose and preferably from about 1 to about 2 moles per mole of cellulose. The amount and concentration of water with respect to cellulose are other factors governing the substitution level of the final product. The water content of the reaction mixture can be varied from about 0.5 part to about 5.0 parts of water per part of cellulose and preferably from about 1.5 to about 3.5 parts of water per part of cellulose.

As set forth hereinafter in the examples, the cellulosic material in suitable particulate form is suspended or mixed with the alcoholic medium of the reaction mixture with agitation, and the alkali solution is added with agitation. This is the preferred mode of operation and thus dispenses with the separate preparation of alkali cellulose. However, if desired, alkali cellulose can be prepared separately, as in many etherification reactions, and this alkali cellulose in ground, shredded, fluffed, or other suitable particulate form can then be mixed with the alcoholic medium, or if desired, the alkali solution can first be mixed with the alcoholic medium of the reaction mixture and the cellulosic material in suitable particulate form added thereto.

Agitation or mixing is important in order to assure uniform distribution in the reaction mixture. In the preferred mode of operation where the cellulosic material is suspended in the alcoholic medium to form a slurry, mixing is readily accomplished by means of paddle stirrers, turbo mixers, and the like, or by simple tumbling in a suitable reaction vessel. If desired, mixing can be accomplished in shredders, dough mixers, Werner-Pfleiderer mixers or the like.

In the second step of the process in accordance with this invention, the cellulosic material is reacted in the presence of the alkali and the alcohol with the dihydroxypropylating agent. The amount of the dihydroxypropylating agent employed will vary with the substitution level desired in the product. Likewise the time over which the reaction is carried out will vary according to the substitution level desired. Desirable products are achieved over a fairly wide range of dihydroxypropyl substitution levels from about 1.4 up to about 6 dihydroxypropyl groups per anhydroglucose unit.

The dihydroxypropylation can be carried out in a single step or in several steps. Generally, more uniformly substituted products are prepared when a multi-step process is employed when cellulose is the furnish. A single step process is satisfactory if the furnish is a cellulose derivative.

The dihydroxypropyl cellulose of this invention can be further modified to much higher degrees of substitution (D.S.) and molar substitution (M.S.) than can other hydroxyl-containing cellulose ethers thanks to their high initial hydroxyl content. By reacting cellulose with 3-chloro-1,2-propane diol the number of hydroxyl groups per base mole of cellulose is increased from 3 to 6 or even more, depending on the dihydroxypropyl M.S. of the product, and the combinations of chained and non-chained dihydroxypropyl groups involved. Further modification of the dihydroxypropyl cellulose with a non-chaining substituent such as an ethyl, methyl or carboxymethyl group can lead to D.S. levels greater than 3, whereas with conventional cellulose derivatives, a D.S. greater than 3 is not possible. With a substituent which can form chains such as hydroxyethyl or hydroxypropyl, extremely high M.S. levels are attainable much more easily than when starting with cellulose. Such further modifications are carried out by methods known in the art for preparing conventional cellulose ethers.

The 1,2-dihydroxypropyl cellulose derivatives are thermoplastic and soften under slight pressure at elevated temperature. These can be extruded, injection molded, compression molded or melt cast to form films, filaments, and other shaped structures as desired. Softening points of some representative 1,2-dihydroxypropyl celluloses are recorded in the following table:

Table I

| Ether | Substitution Level | | Softening Point, ° C. |
|---|---|---|---|
| | DHP | Other | |
| DHPC* | M.S. 3.0 | — | 140 |
| | M.S. 4.5 | — | 100 |
| Hydroxypropylated DHPC | M.S. 1.6 | M.S. 7.1 | 105 |
| Hydroxyethylated DHPC | M.S. 1.6 | M.S. 4.6 | 125 |
| Dihydroxypropylated hydroxyethyl cellulose | M.S. 1.7 | M.S. 3.1 | 110 |
| Methylated DHPC | M.S. 2.0 | D.S. 3.9 | 85 |

*DHPC = 1,2-dihydroxypropyl cellulose

The 1,2-dihydroxypropyl cellulose derivatives of this invention exhibit varied properties, depending upon whether they are plain dihydroxypropyl cellulose or mixed ethers with other substituents such as, e.g., alkyl, hydroxyalkyl, carboxyalkyl, or benzyl modifiers and also on the level of substitution. The water solubility of these products endows them with considerable practical value, e.g., as thickeners for latex paints, various foods, pharmaceutical formulations, tile and joint cements, and paper and textile derivatives. The organosoluble derivatives, such as the benzyl, alkylated, or esterified DHPC, are useful as thickeners or gelling agents for organic liquids.

Dihydroxypropyl cellulose and nonionic mixed derivatives containing substantial amounts of unblocked 1,2-diol groups are more compatible with near-saturated or saturated brine systems at elevated temperatures than are other nonionic cellulose derivatives (e.g., hydroxyethyl cellulose, hydroxypropyl cellulose, and methyl cellulose). This characteristic makes these novel ethers of this invention superior to other nonionic celluloses as thickeners and fluid loss agents for high-salt, high-temperature drilling muds and as thickeners for brine systems used in enhanced oil recovery operations in deep, high temperature formations. Cloud points for some cellulosics according to this invention containing the dihydroxypropyl group and for some other nonionic cellulose derivatives are shown in the following table.

Table II

Precipitation Temperature of 1% Solutions of Dihydroxypropyl Cellulose Derivatives and Other Nonionic Water-Soluble Cellulosics in Brine Media

| Example Number | Type of Derivative | Precipitation Temperature (° C.) | | |
|---|---|---|---|---|
| | | $H_2O$ | 5% NaCl Solution | 26% NaCl Solution |
| 2 | Dihydroxypropyl cellulose | >95 | >95 | >95 |
| 9 | Dihydroxypropylated hydroxyethyl cellulose | >95 | >95 | >95 |
| 7 | Hydroxyethylated dihydroxypropyl cellulose | >95 | >95 | 75–78 |
| — | Hydroxyethyl cellulose | >95 | >95 | 69–74 |
| — | Hydroxypropyl cellulose | 41 | 30 | — |
| — | Methyl cellulose | 56 (gels) | 33 | — |

Another property exhibited by those 1,2-dihydroxypropyl cellulosics having unblocked vicinal hydroxyl groups, and which is not exhibited by other water-soluble cellulose derivatives, is the ability to form strong borate and antimonate complexes with boron and antimony salts. Such complexes are formed spontaneously upon addition of small amounts of a solution of the salt to a solution of the 1,2-dihydroxypropyl cellulose ether. Useful compounds are formed at a weight ratio of about 0.05 to 10 parts of the salt per part of DHPC and preferably 0.05 to 4.

Compounds that can be used to provide borate ions include the alkali metal salts, alkaline earth metal salts, ammonium salts, including metaborates, tetraborates and perborates. Also easily saponifiable esters of boric acids such as trimethyl borate can be used. The preferred compound is borax ($Na_2B_4O_7.10H_2O$).

Antimonate ions can be provided by alkali metal or ammonium pyroantimonates such as potassium pyroantimonate ($KSb(OH)_6.\frac{1}{2} H_2O$).

The formation of borate or antimonate complexes causes significant changes in rheological characteristics of solutions of the 1,2-dihydroxypropyl cellulose. Thus, the solutions are more viscous than solutions of a corresponding 1,2-dihydroxypropyl cellulose; they are more stringy, exhibit increased normal stress and have considerably changed viscosity-shear rate profiles. Rheological properties vary according to the borate or antimonate to cellulose ratio. As a result, the complexes are more efficient thickeners than the regular cellulosics or than the 1,2-dihydroxypropyl celluloses per se. The products are good thickeners in brine systems as well as in fresh water. In fact some of the complexes are more stable in brine than in fresh water. The complexes are useful additives in coating formulations and in polymer flooding applications for post-primary oil recovery. In addition, due to the presence of the boron or antimony molecule, they can impart fire-retardant properties to textiles, paper products, carpet backing pastes, and other coatings where fire retardance is a desideratum. They are also useful in preparation of slurry explosives.

The practice of this invention is illustrated by the following examples which are representative of the types of products mentioned earlier. All reagents and nonsolvents employed are based on the weight of cellulose furnish unless otherwise specified.

EXAMPLE 1

One part fine-cut chemical cotton (dry basis) was slurried in 11.7 parts of isopropyl alcohol (IPA) contained in a jacketed resin flask equipped with a sealed stirrer assembly, stainless steel stirring rod, reflux condenser, and pressure-equalizing addition funnels. Air was removed by sparging with nitrogen, and a slightly positive nitrogen pressure was maintained thereafter to prevent oxygen contamination during alkali cellulose preparation and reaction stages. The slurry temperature was reduced to 15° C. Then NaOH solution (prepared by mixing 0.59 part of NaOH and 1.55 parts of water based on cellulose) was added dropwise with stirring over 15 minutes. The slurry was stirred for one hour at 15° C. Then 0.76 part of distilled 3-chloro-1,2-propanediol (CPD) of refractive index ($\eta_D^{30}$) of 1.47715 to 1.47720 diluted with 1.22 parts of IPA was added dropwise over 15 minutes. The temperature was raised to 70° C. and the slurry stirred for 1.5 hours at 70° C. Then, with the temperature still at 70° C., three parts of 50% NaOH solution was added dropwise over 15 minutes. This was followed by the dropwise addition over 15 minutes of 3.42 parts of distilled CPD diluted with 1.22 parts of IPA. Then the reaction mass was stirred for 1.5 hours at 70° C., after which time it was cooled to room temperature. After the excess liquid was filtered off, the product was washed twice with 80 weight percent aqueous IPA, and in the third wash the slurry was adjusted to pH 8.2 with acid. The product was then washed chloride-free with 80 weight percent aqueous acetone, then with anhydrous (95 to 98 weight percent) acetone. After removal of excess acetone, the product was dried in vacuo at 60° C. Yield was 1.87 parts per part of original cellulose when compared on a dry basis. The weight gain of 0.87 part per part of cellulose corresponds to a dihydroxypropyl molar substitution (M.S.) of 1.9 moles/mole of cellulose. The Brookfield viscosity of a 1% aqueous solution of this sample was 980 cps. at 30 r.p.m. and 800 cps. at 60 r.p.m., using a #3 spindle. The solution was slightly hazy.

The addition of borax decahydrate to a 1% solution of the dihydroxypropyl cellulose sample resulted in great changes in the rheological character of the solution. The following table shows these changes as well as the data obtained when the solutions were prepared in 5.3% brine (40.2 parts NaCl, 10.6 parts $CaCl_2$, and 4.76 parts $MgCl_2.6H_2O$ in one liter distilled water). Pituity shown in the table is a measure of the tensile viscosity of the solutions. It is determined by immersing a stainless steel rod in the solution to a specified depth, withdrawing the rod at a constant rate and measuring the distance that a string or filament of the solution is drawn above the surface of the solution before it breaks.

Table III

| Borax/Cellulose Weight Ratio | 1% Solution in Distilled Water | | | 1% Solution in 5.3% Brine | | |
|---|---|---|---|---|---|---|
| | 0 | 0.05/1 | 1/1 | 0 | 0.05/1 | 1/1* |
| Brookfield Viscosity (cps.) | | | | | | |
| at 6 rpm | 1200 | 6000 | 54,000 | 1000 | 2000 | 82,000 |
| at 12 rpm | 1100 | 5000 | 53,000 | 900 | 2000 | 85,000 |
| at 30 rpm | 880 | 4400 | >40,000 | 760 | 1600 | >40,000 |
| at 60 rpm | 700 | 4000 | >20,000 | 620 | 1400 | >20,000 |
| Spindle Number | 3 | 5 | 5 | 3 | 5 | 5 |
| Pituity (cms.) | 6 | >60 | 5 | 6 | 14 | 0 |

*This solution gels on shaking, becomes flowable again on standing.

The above experiment was repeated using a technical grade of CPD (99% CPD — Aldrich chemical Co.) having a refractive index ($\eta_D^{30}$) of 1.47705. The resulting dihydroxypropyl cellulose was insoluble in water. A 1% slurry of the sample in water had a Brookfield viscosity of only 10 cps. at 30 and 60 r.p.m. On standing, the particles of dihydroxypropyl cellulose ether settled out rapidly. Similarly poor results were observed when using the forecuts and pot residues from distillation of crude CPD.

EXAMPLE 2

The procedure of Example 1 was repeated using a high grade fine-cut wood pulp (high alpha-cellulose content) as the cellulose furnish. The weight gain of 0.85 part per part of wood pulp indicated a dihydroxypropyl M.S. of 1.9. The dihydroxypropyl cellulose dissolved in water to give a clear solution. The Brookfield viscosity of a 1% aqueous solution was 1600 cps. at 30 r.p.m. and 1210 cps. at 60 r.p.m. with the #3 spindle.

The addition of borax decahydrate to a 1% solution of this sample to give a borax decahydrate to sample weight ratio of 0.5/1 increased the Brookfield viscosity at 30 r.p.m. from 1600 cps. to 36,200 cps., indicating that the borax complex of this sample is a very efficient thickener for aqueous systems.

Some dried borax complexes were prepared by addition of borax solution to an aqueous acetone slurry of the dihydroxypropyl cellulose of Example 2, followed by dehydration with acetone, and drying from the acetone-wet state. These dried complexes also showed enhanced thickening power compared to the dihydroxypropyl cellulose sample when dissolved in water at a concentration of 1%. The Brookfield viscosity at 30 r.p.m. (#5 spindle) of a 1% aqueous solution of a dried complex having a borax to sample weight ratio of 0.063/1 was 32,800 cps.

EXAMPLE 3

The procedure of Example 1 was repeated except that the washed dihydroxypropylated sample after dehydration with acetone was not dried, but solvent exchanged to IPA. For further dihydroxypropylation, the IPA-wet filter cake was slurried in a total of 6.9 parts of IPA per part sample (dry basis) and stirred at 25° C. while sparging with nitrogen to remove air. A slightly positive nitrogen pressure was maintained for subsequent operations. With the slurry temperature at 25° C., 1.21 parts of 50% NaOH solution per part of sample was added dropwise over 15 minutes. Water (0.29 part per part of sample) was added to increase the swelling of the alkalized sample. The slurry was stirred a total of 1 hour at 25° C. Then 1.19 parts of distilled CPD per part sample (diluted with 1.42 parts of IPA per part of sample) was added dropwise over 15 minutes. The temperature was raised to 70° C. and the reaction was run at 70° C. for 3 hours with continuous stirring. After cooling to room temperature, excess liquid was filtered off and the product washed twice with 80 weight percent aqueous acetone. In a third aliquot of 80% aqueous acetone the slurry was adjusted with acid to pH 8.3. The sample was then washed chloride-free with 80 weight percent aqueous acetone. Dehydration by steeping in acetone (95 to 98 weight percent) was followed by removal of excess acetone, and drying in vacuo at 60° C. The yield was 2.38 parts per part of original cellulose furnish when compared on a dry basis. The weight gain of 1.38 parts per part cellulose furnish corresponds to a dihydroxypropyl M.S. of 3.0. A 1% aqueous solution of this sample was clear, and had a Brookfield viscosity of 30 cps. at 30 r.p.m. and 26 cps. at 60 r.p.m. (#2 spindle). The product was thermoplastic, softening under slight pressure at 140° C.

The addition of borax decahydrate to a 1% aqueous solution to the extent that the borax decahydrate to sample weight ratio was 4/1, led to a large increase in Brookfield viscosity from 30 cps. to 760 cps. at 30 r.p.m. and from 26 cps. to 680 cps. at 60 r.p.m. (The higher viscosities were measured with a #4 spindle.)

EXAMPLE 4

The procedure of Example 3 was repeated except that for further dihydroxypropylation the quantities of 50% NaOH solution and distilled CPD were increased to 2.11 parts and 2.41 parts, respectively, per part of the washed dihydroxypropylated starting material. The yield of product (dry basis) was 3.10 parts per part of original cellulose furnish. The weight gain of 2.1 parts per part of cellulose furnish corresponds to a dihydroxypropyl M.S. of 4.5. A 1% aqueous solution of this sample was clear and had a Brookfield viscosity of 130 cps. at 30 r.p.m. and 120 cps. at 60 r.p.m. (#2 spindle).

The addition of borax decahydrate to a 1% solution led to large increases in solution viscosity as follows:

| Weight Ratio of Borax Decahydrate to Sample | Brookfield Viscosity #4 Spindle (cps.) | |
|---|---|---|
| | 30 r.p.m. | 60 r.p.m. |
| None | 130* | 120* |
| 0.5/1 | 1760 | 1900 |
| 4/1 | 2520 | 2620 |

*No. 2 spindle

A shear thickening effect is evident as the shear rate increases from 6 sec.$^{-1}$ at 30 r.p.m. to 12 sec.$^{-1}$ at 60 r.p.m.

The product was thermoplastic, softening under slight pressure at 100° C.

EXAMPLE 5

A dihydroxypropyl cellulose sample of M.S. 1.6 was prepared according to the procedure of Example 1, except that the acetone-wet sample was not dried, but solvent exchanged to tertiary butyl alcohol (TBA). The TBA-wet filter cake was slurried in a total of 8.9 parts of TBA per part of sample (dry basis) and stirred at 25° C. while sparging with nitrogen to remove air. A slightly positive nitrogen pressure was maintained while 0.36 part of 50% NaOH solution per part of dihydroxypropyl cellulose sample was added dropwise with stirring over 15 minutes. After stirring for one hour at 25° C., 1.15 parts of ethylene oxide diluted with 1.03 parts of TBA per part of sample was added dropwise with stirring over 15 minutes from a precooled equalizing addition funnel. (Ice water was pumped through the reflux condenser jacket to prevent loss of ethylene oxide.) With stirring, the temperature of the slurry was raised to 50° C. for 0.5 hour, 55° C. for 1 hour, and 60° C. for 2 hours. The reaction mass was then cooled to room temperature. After excess liquid was filtered off, the hydroxyethylated dihydroxypropyl cellulose sample was washed twice with 80 weight percent aqueous acetone. In the third wash the slurry was adjusted to pH 7.7 with acid. The sample was washed salt-free with 90% aqueous acetone, followed by dehydration with acetone (95 to 98 weight percent), and drying in vacuo at 60° C. Yield of product was 1.73 parts per part of the dihydroxypropyl cellulose furnish (dry basis). The weight gain of 0.73 part per part of the dihydroxypropyl cellulose sample corresponds to a hydroxyethyl M.S. of 4.6.

This mixed derivative with a dihydroxypropyl M.S. of 1.6 and a hydroxyethyl M.S. of 4.6, dissolved in water to give a clear solution. The Brookfield viscosity of a 1% solution was 25 cps. at 60 r.p.m. At a borax decahydrate to sample weight ratio of 1/1 the viscosity of a 1% solution increased only slightly from 25 to 28 cps. This slight increase in viscosity, which is insignificant compared to the enormous increases observed when borax was added to 1% solutions of Examples 1 to 5, indicates that almost all of the 1,2-diol groups have been blocked by hydroxyethyl groups, and are unable to form strong borax complexes.

This dihydroxypropylhydroxyethyl cellulose sample was observed to be thermoplastic, softening under slight pressure at 125° C. It was found that it could be compression molded into strong clear films above the softening point.

Similar hydroxyethylation of a dihydroxypropyl cellulose made with crude CPD yielded a water-insoluble product.

EXAMPLE 6

A dihydroxypropyl cellulose sample of M.S. 1.6 was prepared according to the procedure in Example 1 except that the acetone-wet sample was not dried, but solvent-exchanged to IPA. The IPA-wet filter cake was slurried in a total of 6.8 parts per part of sample (dry basis) and cooled to 15° C. Air was removed via nitrogen sparging, and a slightly positive nitrogen pressure was maintained thereafter. Then 0.68 part of 50% NaOH solution per part of sample, diluted with 0.56 part water per part of sample, was added dropwise over 15 minutes. The slurry was stirred for 1 hour at 15° C. Then 3.43 parts of 50% NaOH solution (based on weight of the dihydroxypropyl sample) was added over 30 minutes with stirring. Monochloroacetic acid (2.20 parts per part of dihydroxypropyl sample), dissolved in 2.84 parts of IPA per part of sample, was added slowly over a period of 90 minutes, keeping the slurry temperature at 15° C. The temperature was raised to 70° C. and the carboxymethylation reaction run for 2 hours at 70° C. The reaction mass was cooled to room temperature. After excess liquid was filtered off, the product was washed twice with 80 weight per cent aqueous acetone. In the third wash the slurry was adjusted to pH 8.3 with acid. The sample was washed chloride-free with 50 and 60 weight per cent aqueous acetone, and then dehydrated with acetone (95–98%). The sample was dried in vacuo at 60° C. Recovery of product was 0.45 part per part of the dihydroxypropyl cellulose furnish (partial yield). Analysis of the sample indicated a carboxymethyl D.S. of 1.8.

This mixed derivative with a dihydroxypropyl M.S. of 1.6 and a carboxymethyl D.S. of 1.8, dissolved in water to give a clear solution. The Brookfield viscosity of a 1% solution, using a #2 spindle, was 560 cps. at 30 r.p.m. and 490 cps. at 60 r.p.m. Addition of borax did not increase the viscosity.

Similar carboxymethylation of dihydroxypropyl cellulose made with crude CPD led to a water-insoluble sample.

EXAMPLE 7

A dihydroxypropyl cellulose of M.S. 1.6 was prepared according to the procedure of Example 1, except that the acetone-wet sample was not dried, but solvent exchanged to TBA. The TBA wet filter cake was placed in a pressure vessel equipped with a stirring assembly and addition funnels, and slurried at 25° C. in a total of 2.96 parts of TBA and 8.50 parts of heptane per part of dihydroxypropyl cellulose furnish. Air was removed via nitrogen sparging, a slightly positive nitrogen pressure was maintained. With stirring, 0.41 part of 50% NaOH solution per part of dihydroxypropyl cellulose furnish, diluted with 0.35 part water per part of furnish, was added dropwise over 10 minutes. The slurry was stirred at 25° C. for 1 hour. Then 3.44 parts of propylene oxide per part of furnish was added with stirring. The pressure reactor was sealed, and heated slowly to 100° C. The hydroxy-propylation reaction was run at 100° C. for 4 hours. The slurry was then cooled to room temperature, the flask disconnected from the reactor head, and excess liquid was removed. The sample was then washed twice with hot water. In the third hot-water wash the slurry was adjusted to pH 7.5 with acid. After washing salt-free with hot water, and draining off excess water on a heated filter, the sample was dried in vacuo at 60°–65° C. Yield on a dry basis was 2.47 parts per part of dihydroxypropyl cellulose furnish. The weight gain of 1.47 parts per part of furnish corresponds to a hydroxypropyl M.S. of 7.0. Analysis showed a hydroxypropyl M.S. of 7.4.

The mixed derivative dissolved in water to give a clear solution. The Brookfield viscosity of a 1% solution was 25 cps. at 60 r.p.m. (#2 spindle). As with Example 5, the viscosity of a 1% solution of the dihydroxypropylhydroxypropyl cellulose sample did not increase significantly on addition of borax, indicating that most of the 1,2-diol groups were blocked by reaction with hydroxypropyl groups.

This dihydroxypropylhydroxypropyl sample was observed to be thermoplastic, softening under slight pressure of 105° C. It was found that it could be compression-molded into strong, clear films above the softening point. It was comparable to conventional hydroxypropyl cellulose in organosolubility.

Similar hydroxypropylation of a dihydroxypropyl cellulose made with crude CPD led to a water-insoluble sample.

EXAMPLE 8

A dihydroxypropyl cellulose sample of M.S. 2.0 was prepared according to the procedure of Example 1 except that TBA was used as the slurry medium instead of IPA. One part of the dried sample was slurried in 11.3 parts of heptane in a pressure vessel at 25° C. Air was removed by sparging with nitrogen, and 2.82 parts of 50% NaOH solution was added rapidly with stirring. The pressure vessel was sealed, with heating and stirring, and 1.46 parts of methyl chloride per part of dihydroxypropyl cellulose furnish was added over a time of 80 minutes. The total reaction time with stirring was 5.75 hours (2 hours at 70° C., 2.25 hours at 80° C., and 1.5 hours at 90° C.). The slurry was cooled to room temperature, the flask disconnected from the reactor head, and excess liquid was removed via filtration. The sample was washed salt-free with hot water after adjusting to pH 6.5 with acid in the first wash. After excess water was removed via filtration, the sample was dried in vacuo at 70° C. Analysis of this methylated dihydroxypropyl cellulose sample indicated a methoxyl content of 33%, corresponding to a methyl D.S. of 3.9. Recovery of this product was only 77% of the theoretical yield, as some material was lost during washing and was not recovered from the filtrate.

This sample dissolved in water to form a clear solution. The Brookfield viscosity of a 1% solution was 117 cps. at 60 r.p.m. The addition of borax to the solution did not lead to an increase in viscosity, indicating that substantially all 1,2-diol groups had been blocked by methylation.

This dihydroxypropylmethyl cellulose sample was observed to soften under pressure at 85° C. It, therefore, can be compression molded into films and other shaped objects at a much lower temperature than either hydroxypropyl cellulose or dihydroxypropylhydroxypropyl cellulose.

EXAMPLE 9

Hydroxyethyl cellulose (HEC) was prepared from fine-cut chemical cotton according to the procedure described in U.S. Pat. No. 2,572,039. One lot was dried from the acetone-wet state in vacuo at 60° C. It was found by analysis to have a hydroxyethyl M.S. of 3.1, and to dissolve in water to give a clear solution. The Brookfield viscosity of a 1% aqueous solution was 250 cps. at 60 r.p.m. (#2 spindle). Another lot of acetone-wet material was not dried, but solvent exchanged to IPA. The sample was then treated essentially as described in Example 1. The HEC furnish was slurried in a total of 6.4 parts of IPA per part of furnish and the slurry lowered to 15° C. Under a nitrogen blanket the alkali cellulose was prepared using 0.64 part of 50% NaOH solution per part of HEC sample after dilution of the NaOH solution with 0.52 part of water per part furnish. After stirring for 1 hour at 15° C., 1.08 parts of 50% NaOH solution per part furnish was added dropwise, followed by 1.87 parts of distilled CPD diluted with 1.33 parts of IPA per part HEC furnish. The temperature was raised to 70° C. and maintained at 70° C. with stirring for two hours. The slurry was cooled to room temperature, excess liquid removed, and the sample was washed twice with 80 weight percent aqueous acetone. In the third wash the sample was adjusted to pH 8.2 with acid, and then washed salt-free with 80 weight percent of aqueous acetone. After three steeps in acetone (95 to 98 weight percent) for dehydration, excess liquid was removed and the sample dried in vacuo at 60° C. The yield was 1.42 parts of sample per part of HEC furnish (dry basis). The weight gain of 0.42 part per part of furnish corresponds to a dihydroxypropyl M.S. of 1.7. The sample was thermoplastic, softening under slight pressure at 110° C.

This hydroxyethyldihydroxypropyl cellulose sample dissolved in water to give a clear solution. The Brookfield viscosity of a 1% solution was 130 cps. at 60 r.p.m. using the #2 spindle. The addition of borax to a 1% solution to give a borax decahydrate to sample weight ratio of 0.05/1 and 1/1 led to increased vicosities at 60 r.p.m. of 320 cps. and 1830 cps., respectively. The increased thickening power is indicative of the formation of a complex between borax and the unsubstituted 1,2-diol groups of the hydroxyethyldihydroxypropyl cellulose sample.

The above experiment was repeated with a technical grade of CPD which was not redistilled before using for dihydroxypropylation of HEC of M.S. 3.1. The resulting sample was water-insoluble. The crude grade of CPD contains cross-linking agents which insolubilize the mixed cellulose derivative.

EXAMPLE 10

The procedure of Example 1 was repeated except that the first lot of distilled CPD (0.76 part per part of cellulose furnish) was replaced with 0.66 part of monochloroacetic acid per part of furnish. The yield of washed and dried carboxymethyldihydroxypropyl cellulose was 2.01 parts per part of furnish. The weight gain was 1.01 parts per part of cellulose. Analysis showed a carboxymethyl D.S. of 0.8, indicating a weight gain of 0.40 part per part of cellulose furnish. The remainder of the weight gain (0.61 part per part of cellulose) indicated a dihydroxypropyl M.S. of 1.4.

The carboxymethyldihydroxypropyl cellulose sample dissolved in water to give a clear solution. The Brookfield viscosity of a 1% aqueous solution was 300 cps. at 30 r.p.m. and 290 cps. at 60 r.p.m. (#2 spindle).

The above experiment was repeated using a technical grade of CPD which was not redistilled. The resulting product was substantially insoluble in water, giving a hazy solution at 1% concentration with a lot of insoluble, but swollen, particles.

EXAMPLE 11

A 1,2-dihydroxypropyl cellulose sample was prepared by the procedure described for Example 1 except that freshly distilled glycidol was used as a substitute for CPD reagent, the 0.76 part of CPD being replaced by 0.69 part of glycidol and the 3.42 parts of CPD being replaced by 3.1 parts of glycidol.

The yield on a dry basis was 1.65 parts of product per part of cellulose. The weight gain of 0.65 part per part of cellulose corresponds to a dihydroxypropyl M.S. of 1.4. The Brookfield viscosity of a 1% aqueous solution was 2200 cps. at 6 r.p.m. (#2 spindle), 1560 cps. at 30 r.p.m., and 1220 cps. at 60 r.p.m. (#3 spindle).

The addition of PPA (potassium pyroantimonate) to a PPA/sample weight ratio of ½ and adjustment of the solution to pH 5 with acid resulted in a great increase in viscosity. The Brookfield viscosity was 80,000 cps. at 6 r.p.m. (#5 spindle). Increasing the PPA/sample ratio to 1/1 and adjustment to pH 4.5 led to immediate gel formation.

EXAMPLE 12

A slurry explosive of the following formulation was prepared:

|  | Parts |
|---|---|
| Monoethanolamine | 10.8 |
| Ammonium nitrate | 35.4 |
| 67% Nitric acid | 17.1 |
| Sodium acetate | 0.77 |
| Pine oil | 0.08 |
| Glass bubbles | 4.47 |
| Dipropylene glycol | 0.74 |
| Calcium nitrate | 29.8 |
| Potassium pyroantimonate | 0.04 |
| Water | 0.32 |
| Dihydroxypropyl cellulose (M.S. 1.8) | 0.48 |

To mix the slurry, the monoethanolamine and 26.09 parts of the ammonium nitrate in prill form were charged to a mixing apparatus. While mixing, the nitric acid, sodium acetate and pine oil were added in sequence, each being thoroughly mixed prior to addition of the next. pH was adjusted to about 4.9 with nitric acid or monoethanolamine. The dihydroxypropyl cellulose dispersed in dipropylene glycol was added and mixed thoroughly, then heated to 120° F. for about 10 minutes to hydrate the dihydroxypropyl cellulose. The remainder of the ammonium nitrate (9.31 parts) was added and mixed well, followed by the calcium nitrate and the glass bubbles. When the above were well mixed, the potassium pyroantimonate and water were added and mixed for two minutes.

Simultaneously there was prepared a second slurry containing the same quantity of hydroxypropyl guar gum (0.3–0.4 hydroxypropyl D.S.) but otherwise identical to the above.

In each case the viscosity of the slurry was measured just prior to the second addition of ammonium nitrate. The slurry containing dihydroxypropyl cellulose exhibited a viscosity of 90.6 poises while the other exhibited a viscosity of 694. This lower viscosity makes ingredient addition much easier and more efficient and even with the lower viscosity no ingredient separation was observed. After crosslinker addition, this lower viscosity was still evident making this slurry easier to pump and pour.

Portions of the slurries were stored in a test chamber at 120° F. and their gel characteristics tested periodically via penetrometer readings. After 27 days' testing, the slurry containing DHPC exhibited a penetration value of 1.06 (units of 0.1 mm./g. applied) while that containing hydroxypropyl guar had a value of 2.89. Thus the DHPC formed a much firmer, more desirable gel.

Ballistic characteristics were comparable.

EXAMPLE 13

The product of Example 1 was tested as a fluid loss additive for drilling muds using the test procedures specified by the American Petroleum Institute (API) Code, R.P. 13B, Section 3, pages 8 and 9. Simultaneously hydroxyethyl and carboxymethyl cellulose, two presently used fluid loss additives, were similarly tested.

A mud suspension in saturated sodium chloride solution was employed. This mud was prepared as follows: To 350 ml. of saturated NaCl solution at 70°–80° F. in a container was slowly added 14.0 g. of Attapulgite Clay 150 while stirring at 5000 r.p.m. on a Hamilton Beach #30 Drinkmaster Mixer. After about one minute the container was transferred to a Multimixer Model 9-B and stirred at 11,000 r.p.m. for 20 minutes. The clay slurry was then aged statically overnight at room temperature. The required quantity of cellulose derivative was then added to the aged clay slurry in 15 seconds while stirring at 5000 r.p.m. via the Hamilton Beach Mixer. After additional stirring for 45 seconds at 5000 r.p.m., the mixture was transferred to the Multimixer Model 9-B and stirred for 5 minutes at 11,000 r.p.m. The slurry was then checked for lumps or gels. (In this work the cellulose derivative was found to be dispersed adequately in all cases.) The slurry was slowly stirred with a metal spatula to reduce foam. When a lot of foam was present, the layer of foam was skimmed off before further testing.

The Baroid Standard Low Pressure Filter Press #302 was used in tests at ambient temperature (21°–29° C.). The apparatus and test procedure are described in the API Code referenced above and in the Baroid Drilling Mud Data Book, Section 900, pages 15 to 17 (1963 edition). No. 987 Baroid filter paper was used in this test and nitrogen was used to pressurize the assembly to 100 p.s.i. The filtration area in this assembly is 7.1 sq. in.

The Baroid High-Pressure, High-Temperature (HPHT) #387 Filter Press was employed in tests at 90° C. The HPHT Baroid apparatus and test procedure are also described in the API Code, referenced above and the Baroid Drilling Mud Data Book, Section 900, pages 21–23. For this test the mud slurry was initially heated to 54° C. before adding to the HPHT #387 cell which was equipped with a thermostated jacket to permit heating to the desired temperature for determination of fluid loss. No. 988 Baroid filter paper was employed in this test and the filtration assembly was pressurized to 100 p.s.i. with nitrogen. The filtration area was 3.5 sq. in. Fluid losses were corrected to 7.1 sq. in. as prescribed in Sction 900 of the cited Baroid Drilling Mud Data Book.

Test results are recorded in the following table where it is evident that the DHPC is clearly superior to hydroxyethyl cellulose and carboxymethyl cellulose, the presently used materials, at high temperature and is at least equivalent at lower temperatures.

| | API Fluid Loss at 100 psi. (ml.)[b] | | | | |
|---|---|---|---|---|---|
| | 70–85° F. (21–29° C.) Additive Concentration | | | 194° F. (90° C.) Additive Concentration | |
| Type of Sample | 0 lb./bbl. | 1 lb./bbl. | 0 lb./bbl. | 1 lb./bbl. | 2 lbs./bbl. |
| DHPC[a] M.S. 1.9 | — | 50 | — | 140 | 20 |
| Hydroxyethyl cellulose (M.S. 2.5) | — | 48 | — | 198 | 144 |
| | — | 48 | — | — | — |
| CMC D.S. 0.9 | — | — | — | 176 | 36 |
| D.S. 0.7 | — | 41 | — | — | 44 |

-continued

| | API Fluid Loss at 100 psi. (ml.)[b] | | | | |
|---|---|---|---|---|---|
| | 70–85° F. (21–29° C.) Additive Concentration | | 194° F. (90° C.) Additive Concentration | | |
| Type of Sample | 0 lb./bbl. | 1 lb./bbl. | 0 lb./bbl. | 1 lb./bbl. | 2 lbs./bbl. |
| API Base Mud #4[c] | 100 | — | 210 | — | — |

[a]DHPC = dihydroxypropyl cellulose from Example 2.
[b]Fluid loss at 90° C. corrected to 7.1 sq. in. filter area.
[c]3.5% Attapulgite Clay 150 in 26% NaCl solution.

What I claim and desire to protect by Letters Patent is:

1. An ether of cellulose having at least about 1.4 dihydroxypropyl units per anhydroglucose unit, said ether of cellulose being characterized by being soluble in water and by being thermoplastic.

2. The cellulose ether claim 1 wherein the dihydroxypropyl radical is the sole substituent on said cellulose and is present in amount of about 1.4 to 6 moles per anhydroglucose unit.

3. The reaction product of a cellulose ether of claim 2 and about 0.05 to 4 part by weight of potassium pyroantimonate per part thereof.

4. A mixed ether of cellulose having at least about 1.4 dihydroxypropyl units per anhydroglucose unit and a second substituent selected from the class consisting of
   (a) carboxymethyl units at a level of about 0.01 to about 1.8 per anhydroglucose unit;
   (b) hydroxyethyl units at a level of about 0.01 to 5 per anhydroglucose unit; and
   (c) hydroxypropyl units at a level of about 0.01 to 8 per anhydroglucose unit.

* * * * *

Disclaimer 4,096,326.—*Albert R. Reid*, Hockessin, Del. DIHYDROXYPROPYL CELLULOSE. Patent dated June 20, 1978. Disclaimer filed March 28, 1979, by the assignee, *Hercules Incorporated*.

Hereby enters this disclaimer to claims 1 and 2 of said patent.

[*Official Gazette March 11, 1980.*]